United States Patent [19]
Altman et al.

[11] Patent Number: 4,803,247
[45] Date of Patent: Feb. 7, 1989

[54] POLYAMIDE COMPOSITIONS HAVING NITRILE RUBBER AND COPOLYMER OF ETHYLENE AND ALPHA-OLEFIN THEREIN

[75] Inventors: Carl E. Altman, Warren; Mocherla K. K. Rao, Middlesex, both of N.J.

[73] Assignee: Allied-Signal Inc., Morristown, N.J.

[21] Appl. No.: 113,933

[22] Filed: Oct. 27, 1987

[51] Int. Cl.$^4$ .............................................. C08L 77/00
[52] U.S. Cl. ........................................ 525/179; 525/66
[58] Field of Search .................................. 525/179, 66

[56] References Cited

U.S. PATENT DOCUMENTS

| | | | |
|---|---|---|---|
| 2,374,069 | 4/1945 | Balthis | 264/211 |
| 3,218,371 | 11/1965 | Grabowski | 525/179 |
| 3,413,378 | 11/1968 | Magat et al. | 525/431 |
| 3,505,267 | 4/1970 | Burkey | 524/169 |
| 3,845,163 | 10/1974 | Murch | 525/183 |
| 3,966,839 | 6/1976 | Sims | 525/179 |
| 4,173,556 | 11/1979 | Coran et al. | 525/182 |
| 4,174,358 | 11/1979 | Epstein | 525/183 |
| 4,197,379 | 4/1980 | Coran et al. | 525/142 |
| 4,247,665 | 1/1981 | Daniels et al. | 525/421 |
| 4,305,865 | 12/1981 | Okada et al. | 525/66 |
| 4,307,207 | 12/1981 | Wiggins et al. | 525/66 |
| 4,397,987 | 8/1983 | Cornell | 525/179 |
| 4,500,668 | 2/1985 | Shimizu et al. | 524/427 |
| 4,508,867 | 4/1985 | Sato | 525/183 |
| 4,537,929 | 8/1985 | Nangrani | 525/66 |
| 4,594,386 | 6/1986 | Olivier | 525/66 |
| 4,619,962 | 10/1986 | Sato | 524/401 |

FOREIGN PATENT DOCUMENTS

| | | | |
|---|---|---|---|
| 2943515 | 5/1981 | Fed. Rep. of Germany | 525/183 |
| 1576734 | 8/1969 | France . | |
| 0021252 | 2/1978 | Japan | 525/183 |
| 0703553 | 12/1979 | U.S.S.R. | 524/159 |

OTHER PUBLICATIONS

Chemical Abstracts–38 Elastomers–vol. 72, 1970, p. 59.
Chemical Abstracts–36 Plastics Manuf.–vol. 81, 1974, p. 43.

*Primary Examiner*—John C. Bleutge
*Assistant Examiner*—A. Carrillo
*Attorney, Agent, or Firm*—Melanie L. Brown

[57] ABSTRACT

The present invention is directed to a polyamide composition comprising from about 50 to 90% by weight of a polyamide, from about 10 to 40% by weight of a nitrile rubber, and from about 5 to 50% by weight of a reactive rubber which contains groups which are reactive with the end groups of the polyamide. The composition preferably contains about 2 to 20% by weight of a plasticizer for nylon, and can optionally contain from about 0 to 10% by weight of a polyamide chain extender.

The present invention also includes gas permeation resistant articles including articles resistant to chlorofluorohydrocarbon permeation. Articles of particular interest include extruded hose and tubing which contain at least one layer made of the above described composition. It has been discovered that the composition of the invention resists chlorofluorohydrocarbon permeation and at the same time can provide the flexibility needed for use in various hose and tubing applications.

6 Claims, No Drawings

POLYAMIDE COMPOSITIONS HAVING NITRILE RUBBER AND COPOLYMER OF ETHYLENE AND ALPHA-OLEFIN THEREIN

BACKGROUND OF THE INVENTION

This invention relates to polyamide compositions; and more particularly, to polyamide compositions which are resistant to chlorofluorohydrocarbon permeation.

Polyamide resins, including polycaprolactam, known under the generic name nylon, are noted for a number of their properties such as hardness, high tensile strength, toughness, and rigidity, but not flexibility. To achieve flexibility, it has been common practice to add a myriad of plasticizers.

At the present time, it is known to use nitrile rubber-based compositions to make flexible, fluorcarbon permeation resistance articles, such as hose and tubing. Additionally, nitrile rubbers, which are butadiene acrylonitrile copolymers, are flexible, and known for gas permeation resistance and oil resistance. The nitrile component resists fluorocarbon permeation and yet provides a flexible polymeric matrix. However, it is desirable not only to have a composition that has flexibility, and resistance to permeation, but at the same time has higher use temperatures and better general physical properties than existing nitrile rubber tubing and hose.

*The Vanderbilt Rubber Handbook*, R. T. Vanderbilt (1978), reviews nitrile rubber at pp. 169–187. Although it is known to blend nitrile rubber with materials such as polyvinyl chloride, chlorosulfonated polyethylene, and EPDM (Vanderbilt pp. 175, 186), to achieve a final composition having a combination of properties, compositions containing nitrile rubbers are often difficult to process above about 149° C. (300° F.) (Vanderbilt, p. 183). U.S. Pat. Nos. 4,197,379; 4,508,867 and 4,619,962 also disclose blends of nitrile rubber and nylon.

SUMMARY OF THE INVENTION

The present invention is a polyamide composition comprising from about 50 to 90% by weight of a polyamide, from about 10 to 40% by weight of a nitrile rubber, and from about 5 to 50% by weight of a reactive rubber which contains groups which are reactive with the end groups of the polyamide. The composition preferably contains about 2 to 20% by weight of a plasticizer for nylon, and can optionally contain from about 0 to 10% by weight of a polyamide chain extender.

The present invention also includes gas permeation resistant articles including articles resistant to chlorofluorohydrocarbon permeation. Articles of particular interest include extruded hose and tubing which contain at least one layer made of the above described composition. It has been discovered that the composition of the invention resists chlorofluorohydrocarbon permeation and at the same time can provide the flexibility needed for use in various hose and tubing applications.

DESCRIPTION OF THE PREFERRED EMBODIMENTS

The present invention is a polyamide composition which resists gas permeation, particularly chlorofluorohydrocarbon permeation.

The composition of the present invention combines at least one polymer component, a polyamide, to attain improved physical properties and high temperature use, with a lesser amount (based on total weight of the composition) of at least one nitrile rubber to achieve the characteristics of chlorofluorohydrocarbon permeation resistance.

The composition contains from about 10 to 50% by weight of a nitrile rubber which is a polyelastomer. The polymer nature of this elastomer enables the composition to resist permeation of chlorofluorohydrocarbons of the type used as refrigerants in refrigeration and air conditioning equipment, such as aerosol propellants, and the like. Typical chlorofluorohydrocarbons are trichlorofluoromethane, dichloromethane, chlorotrifluoromethane, bromotrifluoromethane, tetrafluoromethane, dichlorofluoromethane, chlorodifluoromethane, trifluoromethane, trichlorotrifluoroethane, dichlorotetrafluoroethane, dibromotetrafluoroethane, chloropentafluoroethane, hexafluoroethane, octafluorocyclobutane, mixtures thereof, and other fluorocarbons of like compositions.

The present inventors have discovered that the combination of the polyamide and nitrile rubber in and of itself does not result in a composition with a degree of flexibility that makes it particularly desirable for hosing, tubing and the like. The composition can be made more flexible by also adding at least one third polymer component, a reactive rubber-type material as described below. The addition of this material increases the flexibility to an extent greater than that which can be attained by the nitrile rubber content alone, as measured by standard tests for flex modulus. Thus, the addition of this third component, the reactive rubber, results in a composition that demonstrates greater flexibility as demonstrated by a flex modulus that can typically range from about 20,000 psi to about 70,000 psi. The following is a detailed description of the various components reviewed above and the amounts useful in the composition of the present invention.

Polyamides suitable for use herein include the long chain polymeric amides having recurring amide groups as part of the polymer backbone and preferably having a number average molecular weight, as measured by end group titration of about 15,000 to 40,000. The polyamides suitable for use herein can be produced by any conventional process known in the art.

Non-limiting examples of such polyamides are: (a) those prepared by the polymerization of lactams, preferably epsilon-caprolactam (nylon 6); (b) those prepared by the condensation of a diamine with a dibasic acid, preferably the condensation of hexamethylene diamine with adipic acid (nylon 6,6), the condensation of hexamethylene diamine with sebacic acid (nylon 6,10) and polytetramethylene adipamide (nylon 4,6); and (c) those prepared by self-condensation of amino acids, preferably self-condensation of 11-aminodecoanoic acid (nylon-11; or random, block, or graft interpolymers consisting of two or more of these polyamides. Preferred are those obtained by the polymerization of epsilon-caprolactam. The most preferred are copolymers of caprolactam and combinations of diamines and diacids wherethe ratio of caprolactam to diamine and diacid varies widely. Particularly preferred copolymers are copolymers of caprolactam and hexamethylene diamine and adipic acid (forming $N_{6,66}$).

"Polyamides such as nylon-6 or nylon 6,6 can contain a variety of terminal functionalities, including: (a) a carboxyl group attached to both ends of the polyamide chain; (b) a carboxyl group attached to one end and an amide group attached to the other end of the polyamide chain (the "capped" end) (only polycaprolactams); (c) an amino group attached to both ends of the polyamide chain; and (d) a carboxyl group attached to one end and one amine group attached to the other end of the polyamide chain (polycaprolactams).

The polycaprolactam, if unwashed, can contain up to 15 percent, and typically from 0.5 to 12 percent by weight based on the weight of polycaprolactam, of a caprolactam monomer of water extractable caprolactam oligomers. In a $N_{6,66}$ compound, the caprolactam amount corresponds to the amount of nylon 6 in the $N_{6,66}$.

The composition includes from about 40 to 90% by weight of the polyamide, preferably 50 to about 75% by weight, more preferably 55 to about 65% by weight. Any combination of polyamides within these ranges is also within the contemplation of the invention.

The composition additionally includes a second polymer component, a nitrile rubber, in percentages ranging from about 5 to 40% by weight, preferably 10% to 35%, more preferably from about 15% to 35%, and most preferably from about 20% to 30% by weight. The nitrile rubbers useful in the composition include the nitrile rubbers referenced in the Vanderbilt Rubber Handbook, supra, pages 169–187. Generally, nitrile rubber userful in the context of the present invention is a copolymer of butadiene and acrylonitrile and has a relatively low modulus. It is known under several generic names including nitrile rubber Buna N, and NBR with the most popular generic name being nitrile rubber. Typically, nitrile rubber contains 5 common commercial levels, ranging in acrylonitrile content of about 20% to about 60% by weight. Commonly available are levels of about 20, 28, 33, 40 and 50% by weight of acrylonitrile, with a relatively low modulus. The nitrile rubber can have additional monomers as part of the basic copolymer system, such as $\alpha,\beta$ unsaturated carboxylic acids and their esters, alkyl substituted benzenes, and the like. Illustrative of such monomers are acrylic acid, methacrylic acid, itaconic acid, styrene α-methyl styrene, methyl methacrylic acid, methyl methacrylate and the like. Additional useful nitrile rubbers are disclosed in U.S. Pat. Nos. 4,197,379; 4,508,867; and 4,619,962 which patents are incorporated herein by reference in so far as they disclose useful nitrile rubbers.

Preferred among the nitrile rubbers are those having an acrylonitrile content of about 20% to about 50%, more preferably about 25% to about 40%, most preferably about 28% to about 38%.

The composition of the present invention also contains as a third polymer component, from about 5 to 40% by weight of at least one reactive rubber having a functionality reactive with the end groups of the polyamide. The preferred reactive rubber is an olefinic copolymer, preferable a copolymer of ethylene, and an olefin other than ethylene. Preferred reactive rubbers may be exemplified by the copolymer ethylene and an α-olefin other than ethylene having a reactive moiety grafted to the ethylene copolymer. The ethylene and α-olefin is preferably a copolymer of ethylene and an α-olefin selected from at least one $C_3-C_8$, preferably $C_3-C_6$ α-olefin. Propylene is a preferred monomer selected as the $C_3-C_8$ α-olefin in the copolymer. Other $C_3-C_6$ α-olefins, such as 1-butene, 1-pentene, and 1-hexane can be used in place of or in addition to propylene in the copolymers.

The carboxyl or carboxylate functionality, can be supplied by reacting the ethylene/$C_3-C_6$ α-olefin copolymer with an unsaturated reactive graft moiety taken from the class consisting of $\alpha, \beta$-ethylenically unsaturated dicarboxylic acids having from about 4 to 8 carbon atoms, or derivatives thereof. Such derivatives include anhydrides of the dicarboxylic acids. Illustrative of such acids and derivatives are maleic acid, maleic anhydride, maleic acid monoethyl ester, metal salts of maleic acid monethyl ester, fumaric acid, fumaric acid monoethyl ester, itaconic acid, vinyl benzoic acid, vinyl phthalic acid, metal salts of fumaric acid monoethyl ester, monoesters of maleic or fumaric acid or itaconic acids where the alcohol is methyl, propyl, isopropyl, butyl, isobutyl, hexyl, cyclohexyl, octyl, 2-ethyl hexyl, decyl, stearyl, methoxy ethyl, ethoxy ethyl, hydroxy or ethyl, and the like. The reactive moiety can be grafted to the ethylene copolymer by any well-known grafting process.

A useful reactive copolymer of ethylene and an α-olefin contains from about 30 to 60 and preferably about 40 to 45 weight percent of the α-olefin based on the ethylene. The copolymer also contains from about 0.1 to 9 percent, and preferably about 0.1 to 4 percent, and more preferably about 0.3 to 2.0 percent by weight of the graft moiety. The graft copolymer may vary in its molecule weight. In some embodiments, the graft copolymer has a number average molecular weight of from typically about 2,000 to 100,000, preferably about 2,000 to 65,000, more preferably about 5,000 to 35,000, and most preferably about 5,000 to 20,000. Typical values of reduced solution viscosity (RSV) are from about 0.5 to 3.5. A RSV of 2.8 corresponds to a number average molecular weight of about 80,000, an RSV of 2.0 corresponds to 35,000, and RSV of 1.0 corresponds to a number average molecular weight of 12,000. RSV is measured on a 0.1% solution in decolin at 135%C.

Preferred amounts of the reactive rubber are about 5 to about 30%, more preferably about 10 to about 25% by weight of the total composition.

The composition may contain as a fourth component, a plasticizer that is suitable for plasticizing the polyamide component of the composition. The flexibility of the overall composition of the invention can be improved to an even greater extent with the addition of such a plasticizer. Preferred amounts of plasticizer range from about 2 to 20% by total weight of the composition, particularly preferred being about 5% to about 20%. Such plasticizers may vary widely and include but are not limited to lactams such as coprolactam and lauryl lactam, sulfonamides such as o,p-toluene sulfonamide and n-ethyl o,p-toluene sulfonamide. Other plasticizers include those selected from the group consisting of phthalate plasticizers, adipate plasticizers, phosphate plasticizers, glycolate plasticizers as well as the indicated sulfonamide plasticizers, trimellitate plasticizers and polymeric type permanent plasticizers. Other useful plasticizers are reviewed in U.S. Pat. No. 4,197,379, supra.

Optionally, it has been found that if large amounts of a plasticizer are used to attain greater flexibility in the overall composition, it may also be desirable to add a fifth component, a polyamide chain extender to attain a higher molecular weight species with a melt index suitable for extrusion type products. A higher molecular weight species will retain greater levels of plasticizer without exuding them from the compositions. By polymeric chain extender is meant a compound with two or more functional groups which can react with the end groups of a polymer chains. Chain extenders may be either monomeric or polymeric, and include such compounds as maleic anhydride modified polymers or similar polymers having reactive sites. Suitable amounts range from about 0 to 10% by weight, preferably 0 to 5% and most preferably about 0.1 to about 3%.

It should also be appreciated that in certain embodiments of the present invention, additional polyamides may be added to change the reactivity or surface characteristics of the overall compositions without changing the base polyamide component. For example, there may be added excess amine-terminated polycaprolactam or an additional polyamide which is an acid, balanced or capped polycaprolactam, which would change the polarity of the surface of the compositions. This would serve to improve the adhesion properties of the overall composition.

The compositions of the invention may also contain one or more conventional additives which do not materially affect the impact properties of the composition of the present invention such as stabilizers and inhibitors of oxidative, thermal, and ultraviolet light degradation, lubricants and mold release agents, colorants, including dyes and pigments, flame-retardants, fibrous and particulate fillers and reinforcements, nucleators, and the like. These additives are commonly added during the mixing step.

Representative oxidative and thermal stabilizers which may be present in blends of the present invention include Group I metal halides, e.g., sodium, potassium, lithium; cuprous halides, e.g., chloride, bromide, iodide; hindered phenols, various phosphites, hydroquinones, and varieties of substituted members of those groups and combinations thereof.

Representatives ultraviolet light stabilizers, include various substituted resorcinols, salicylates, hindered amines, benzotriazoles, benzophenones, and the like.

Representative lubricants and mold release agents include stearic acid, stearyl alcohol, and stearamides. Representative organic dyes include nigrosine, while representative pigments, include titanium dioxide, cadmium sulfide, cadmium selenide, phthalocyanines, ultramarine blue, carbon black, and the like.

Representative flame-retardants include organic halogenated compounds such as decabromodipheynl ether and the like.

The compositions of this invention can be prepared by melt blending a polyamide and at least one polymer into a uniform mixture in a single or twin screw extruder or other suitable melt-compounding equipment.

The compositions can be made into a wide range of useful articles by conventional molding methods employed in the fabrication of thermoplastic articles, i.e., as molded parts, extruded shapes, e.g., tubing, films, sheets, fibers, sheets, fibers and oriented fibers, laminates and wire coating. "Molding" means forming an article by deforming the blend in the heated plastic state.

The composition has improved impact resistance even at high and low temperatures.

The composition of the present invention is particularly useful for extruded articles including tube and hosing to transport chlorofluorohydrocarbon fluids. Typical hosing is described in the Vanderbilt Rubber Handbook at page 709 to 718, supra.

The composition of the above-referenced application is useful in making a variety of these types of tubing and hose as well as extruded tube and hose, pipe made of nylon, coextrusions of nylon with other polymeric materials, and coatings.

The examples set forth below illustrate the nature of the invention and the manner of carrying it out. The examples show an unexpected improvement in notched Izod impact resistance when using even a small amount of amine-terminated polycaprolactam. The improvement was particularly significant at lower temperatures. The invention should not be considered as being limited to the details of the Examples. All parts are percents by weight unless otherwise indicated.

EXAMPLES

The following examples illustrate the nature of the invention and the manner of carrying it forth. The Examples illustrate that the composition of the above-referenced application can be made which can contain up to about 40% of nitrile rubber and still maintain physical properties while having reduced flexural modulus indicating a more flexible compound.

The compositions in the following Examples were prepared in some cases by first dry blending the materials. The dry blended material was melt extruded at a melt temperature of about 232° C., using a 33 mm diameter twin screw extruder at an rpm of 100. Extruders strands were rapidly passed through a water bath. The strands were passed through a pelletizing machine, and the pellets were collected. Test specimens were injection molded under appropriate molding conditions at a temperature typically from 10° F. to 30° F. above each composition's melting point.

The melt index was determined according to ASTM D-1238 Condition Q. The impact values were tested according to ASTM D-256 notched Izod using ⅛" test specimens. The tensile and elongation properties were tested according to ASTM D-638, and the flexural modulus was tested according to ASTM D-790.

In the Examples, the compositions were made of polyamide which was a nylon 6,66 copolymer having 85 mole percent of caprolactam and 15 mole percent of hexamethylene adipamide groups. The nylon 6/66 had a formic acid viscosity of 70. The composition contained nitrile rubber having an acrylonitrile content of 34% and a Mooney viscosity of 50, supplied by B.F. Goodrich. The composition further contained as a plasticizer, Santicizer 8 which is sulfonamide supplied by Monsanto.

The compositions of the present invention also contained an ethylene propylene rubber which was grafted with maleic anhydride and sold by Exxon as Vistalon MDV 746. This rubber was 44.5 ethylene, 55% propylene and had 0.5% maleic anhydride.

Certain of the compositions contained less than 1% of carbon black, supplied as a nylon-based concentrate. The following tables summarize the compositions evaluated and their physical properties. Each composition contained about 0.2% to about 0.4% of a polyamide chain extender which was ethylene-maleic anhydride polymer sold by Monsanto Company as EMA Resin Grade 1103. A review of the data indicates that the use of the EP rubber in combination with the plasticizer results in a composition where tensile properties are maintained bu the flex modulus decreases substantially.

TABLE I

| Composition | 1 | 2 | 3 | 4 | 5 | 6 | 7 | 8 |
|---|---|---|---|---|---|---|---|---|
| XPN-1539F | 61.04 | 60.12 | 48.68 | 37.23 | 41.05 | 44.86 | 46.39 | 57.95 |
| EMA | 0.40 | 0.39 | 0.32 | 0.24 | 0.27 | 0.29 | 0.30 | — |
| Santicizer 8 | 17.6 | 17.34 | 14.04 | 10.74 | 11.84 | 12.94 | 13.38 | — |
| N—(-butylbenze)sulfonamide | | | | | | | | 9.00 |
| Nitrile Rubber | 20.0 | 20.0 | 35.0 | 50.0 | 35.0 | 20.0 | — | — |
| EP Rubber | — | — | — | — | 10.0 | 20.0 | 30.0 | 30.55 |
| Carbon Black | — | 1.2 | 1.2 | 1.2 | 1.2 | 1.2 | 1.2 | — |
| Properties | | | | | | | | |
| Tensile Strength (psi) | 5,545 ±377 | 5,885 ±212 | 4,795 ±632 | 2,532 ±47 | 3,223 ±268 | 2,886 ±175 | 3,895 ±662 | 4.830 ±429 |
| Yield Strength (psi) | 3,648 ±110 | 3,852 ±70 | 3,289 ±16 | 2,091 ±75 | 2,369 ±73 | 2,065 ±86 | 2,699 ±38 | 3,166 ±119 |
| Ult. Elongation (%) | 261 ±43 | 218 ±20 | 191 ±14 | 118 ±16 | 102 ±26 | 90 ±14 | 480 ±30 | 160 ±28 |
| Yield Elongation (%) | 20 ±4 | 30 ±6 | 26 ±4 | 7 ±3 | 20 | 20 | 48 ±3 | 30 ±3 |
| Flex. Strength (%) | 2,964 | 2,542 ±85 | 2,406 ±21 | 1,728 ±24 | 3,068 ±45 | 2,537 ±112 | 1,032 ±9 | 1,842 ±23 |
| Flex. Modulus (%) | 61,874 | 62,994 ±984 | 59,728 ±4,675 | 56,630 ±2,185 | 39,001 ±865 | 30.771 ±1,097 | 22,036 ±551 | 42,253 ±1,175 |
| Notched Izod | 2.2 ±0.1 | 2.3 ±0.2 | 2.3 ±0.1 | 12.2 ±1.2 | 13.3 ±0.3 | 16.2 ±0.3 | 22.6 ±0.5 | 23.9 ±0.3 |
| Drop Wt. Impact | | 105 ±17 | 115 ±13 | 200 ft/lbs | 200 ft/lbs | 200 ft/lbs | 200 ft/lbs | 200 ft/lbs |

The test procedure entailed obtaining tare weight of equipment assembly (cell, pressure cap, test specimen, screen); clamping test specimen, cooling assembly to about −20° F., charging about 60 grams of dichlorodifluoromethane (Refrigerant 12), sealing charged cell with pressure cap, conditioning for 2 hours in a 100° C. oven, cooling to ambient, and obtaining initial weight (to 0.01 gram). The specimens were then exposed for 3 days at 100° C., cooled and weighed. Weight checks were repeated at 7 and 14 days from initiation. Weight losses were reported between successive data times. The resulting test data is reported in Table II as follows:

TABLE II

TYPICAL FORMULATIONS EVALUATED FOR FREON PERMEATION RATE AND FLEXIBILITY

| Formulation | 38-1 | 38-2 |
|---|---|---|
| XPN-1539 | 76.3% | 60.12 |
| EMA-1103 | 0.5 | 0.40 |
| Hycar1452X8 | — | 15.00 |
| Vistalon MDV-746 | — | 5.00 |
| Santicizer 8 | 22.0 | 17.34 |
| Stabilizers MBs | 1.2 | 0.95 |
| Carbon Black MB | — | 1.2 |
| Properties | | |
| Tensile Str. (psi) | 5202 | 5047 |
| Ult. Elongation (%) | 155 | 168 |
| Yield Str. (psi) | 3477 | 3373 |
| Yield Elong. (%) | 32 | 22 |
| Flex Str. (psi) | 3202 | 2152 |
| Flex Modulus (psi) | 61,378 | 56,872 |
| Notched Izod ft lb/in | 1.5 | 5.6 |
| Melt Index (dg/min) | 2.8 | 0.6 |
| Freon Permeation Rate-(g/day Avg) | 0.024 | 0.018 |

We claim:

1. A flexible, chlorofluorohydrocarbon permeation resistant composition comprising: from about 40 to 90 percent by weight of at least one polyamide, from about 5 to 40 percent by weight of at least one nitrile rubber, and from about 5 to 40 percent by weight of at least one reactive rubber comprising a copolymer of ethylene and an α-olefin having 3 to 8 carbons, said copolymer having an unsaturated reactive graft moiety reactive with the end groups of the polyamide.

2. The composition of claim 1 wherein said nitrile rubber contains about 20% to 50% acrylonitrile.

3. The composition of claim 1 wherein said reactive graf tmoiety is selected from the group consisting of ethylenically unsaturated dicarboxylic acids having from about 4 to 8 carbon atoms and anhydrides of said dicarboxylic acids.

4. The composition of claim 3 wherein the reactive graft moiety grafted to said ethylene copolymer is selected from the group consisting of maleic acid, maleic anhydride and fumaric acid.

5. The composition of claim 4 wherein said reactive rubber is present in amounts ranging from about 15% to 25% of the total composition.

6. The composition of claim 5 wherein said polyamide is a copolymer of caprolactam and hexamethylene adipamide and said nitrile rubber has an acrylonitrile content of about 25-35%.

* * * * *

UNITED STATES PATENT AND TRADEMARK OFFICE
CERTIFICATE OF CORRECTION

PATENT NO. : 4,803,247

DATED : February 7, 1989

INVENTOR(S) : Carl E. Altman and Mocheria K.K. Rao

It is certified that error appears in the above-identified patent and that said Letters Patent is hereby corrected as shown below:

Column 1, line 18, "Fluorcarbon" should be --fluorocarbon--.

Column 4, line 48, "coprolactam" should be --caprolactam--.

Column 5, line 45, "decabromodipheynl" should be --decabromodiphenyl--.

Column 6, line 67, "bu" should be --but--.

Column 8, line 46, "graf tmoiety" should read --graft moiety--.

Signed and Sealed this

Eighth Day of August, 1989

Attest:

DONALD J. QUIGG

Attesting Officer

Commissioner of Patents and Trademarks